(12) United States Patent
Ter Horst et al.

(10) Patent No.: US 6,567,829 B1
(45) Date of Patent: *May 20, 2003

(54) METHOD OF ORGANIZING AND PRESENTING THE STRUCTURE OF A MULTIMEDIA SYSTEM AND FOR PRESENTING THIS STRUCTURE TO A PERSON INVOLVED, IN PARTICULAR A USER PERSON OR AN AUTHOR PERSON, AND A SOFTWARE PACKAGE HAVING SUCH ORGANIZATION AND PRESENTATION FACILITY

(75) Inventors: Herman J. Ter Horst, Eindhoven (NL); Paul M. Van Loon, Eindhoven (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/935,566

(22) Filed: Sep. 24, 1997

(30) Foreign Application Priority Data

Sep. 30, 1996 (EP) .............................. 96202721

(51) Int. Cl.[7] .......................... G06F 17/00; G06F 15/00
(52) U.S. Cl. .................... 707/501.1; 707/500; 707/526; 345/707; 706/45
(58) Field of Search ......................... 345/302, 326–348, 345/650, 661, 700, 707; 707/500–526, 102–104; 706/45, 50

(56) References Cited

U.S. PATENT DOCUMENTS 5,193,182 A * 3/1993 Bachman et al. ........... 707/100
5,644,686 A * 7/1997 Hekmatpour ................. 706/45
5,788,504 A * 8/1998 Rice et al. ................... 434/219

OTHER PUBLICATIONS

Sara Bratt–Holand and Kay Tislar, Authorware Proffesional, Macromedia, pp. 194–195, Dec. 92.*

Semantic Data Modeling, by J.H. ter Bekke, Prentice Hall, 1997, pps 49–57.

* cited by examiner

Primary Examiner—Alford W. Kindred

(57) ABSTRACT

A method is given for presentation of a multimedia software package, that comprises multiple assets, which can be presented in various combinations in a dialogue with a person involved. In particular, the method uses an explicit information structure description, in which multiple multimedia building blocks are being linked in accordance with an information model that is especially tailored towards a particular application domain. The information model allows expressing in the information structure description of dependency relations stating or implying that certain parts of the multimedia software package should be accessed before other parts. Also, the information model is being expanded with softwared facilities, using which the information structure description is accessible to said person involved, who as a user person can also directly access all multimedia building blocks. Using these, those parts of the software that have already been visited by the user involved become especially marked, and also those parts of the software that can be accessed subsequently by the user person subject to any dependency relations, also become especially marked. In addition, the information model may be expanded with softwared facilities supporting an author person to develop said information structure description under integration with multimedia content creation tools and without programming effort.

34 Claims, 4 Drawing Sheets

METHOD OF ORGANIZING AND PRESENTING THE STRUCTURE OF A MULTIMEDIA SYSTEM AND FOR PRESENTING THIS STRUCTURE TO A PERSON INVOLVED, IN PARTICULAR A USER PERSON OR AN AUTHOR PERSON, AND A SOFTWARE PACKAGE HAVING SUCH ORGANIZATION AND PRESENTATION FACILITY

BACKGROUND TO THE INVENTION

The invention relates to a method for presenting of a multimedia software package that comprises multiple assets, which can be presented in various combinations in a dialogue with a person involved. This person in the first place concerns a standard user, who for reasons of entertainment, business, education or other, enters into a dialogue with the software package. At present, the user person then has often only a very superficial and/or incorrect notion of the many parts that have been built into the package, and also of the parts that have been and/or could be visited, in particular in relation to the parts that had already been visited, and in relation to the interrelationships between the various parts.

In less frequent but just as relevant situations, the person is an author, who must undertake amending or writing of the package, and therefore, should even be more critically aware of parts that are already available or rather, still missing, so that the resulting structure after the amending is optimum in relation to desired content and functionality, and furthermore in relation to time and other resources spent therefor. A particular field of use of the software is for education, training, or instruction, where the package may contain a multiplicity of sections, course units, and the like.

In both situations the listing of the assets or various other properties of the package in some kind of array would do insufficient justice to the various parts and/or features that have been built or should be built into the package. In consequence, there is a need for providing an appropriate manner of presentation of such complex packages, that in particular allows for a dynamic behaviour of the presentation, as based on past experience.

SUMMARY TO THE INVENTION

Therefore, amongst other things it is an object of the present invention to provide a presentation method of the kind described that will be able to present the software package and its constituent parts, not only on the straightforward level of their presence or absence, but also on the level of what they will on various levels of complexity be able to perform. Now, according to one of its aspects, the invention is characterized by the characterizing part of claim 1. The providing of a plurality of multimedia building blocks instead of only a single one, and in particular as being linked in a structure description in accordance with an appropriate information model, will allow a more extensive, and if required, more complete navigation among the various multimedia building blocks and their constituent elements.

Advantageously, said information model is expanded according to claim 2. In combination with the above facilities, similar advantages apply to an author, who will then more easily set up a proper structure of a multimedia software package with a complex set of linkings among parts, so that they can be accessed more fruitfully in future time. Also, the creation process itself is greatly facilitated. Generally, the accessing system and the creating system can be aggregated into a single overall arrangement, on the basis of a structure information database.

Advantageously, various basic information types are "course unit", "multimedia building block", and "item", that are interrelated through content relations, subject relations and requirement relations; "goal", "course unit", "multimedia building block", and "item", related through content relations, subject relations and condition relations; said basic information types have a status variable range comprising the values "done", "reached", "doable" and "not doable", in which the values "done" and "reached" may or may not be identified. An elementary, though highly versatile set of categories has thereby been provided for allowing to develop and present course material for almost any thinkable field of use.

The invention also relates to a software package for effecting such presenting and authoring, and to an associated system. Further advantageous aspects are recited in dependent Claims.

BRIEF DESCRIPTION OF THE DRAWING

These and other aspects and advantages of the invention will be discussed more in detail hereinafter with reference to the disclosure of preferred embodiments, and more in particular with reference to the appended Figures that show.

DETAILED DESCRIPTION OF PREFERRED EMBODIMENTS

Figure 1:
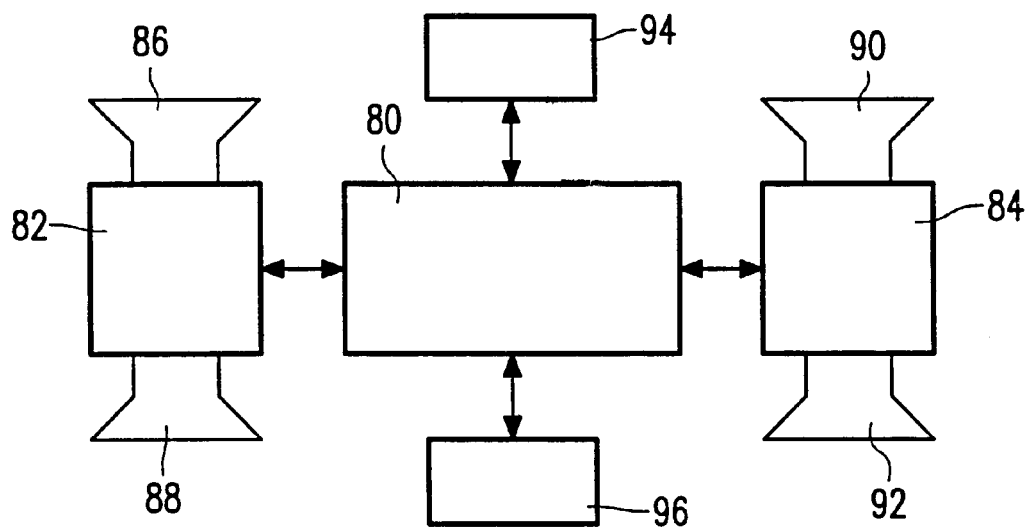
FIG. 1, a hardware presentation system for a multimedia software package.

FIG. 1 shows an exemplary hardware presentation system for a multimedia software package. Therein, the central element is a general-purpose computer-based block 80 with appropriate programming. Blocks 82 and 84 are multimedia presentation subsystems, that are generally controlled by central system 80. By itself, the hardware technology of such presenting through interface elements 86–92 has been in wide use. Video, graphics, audio, text, and further assets are common. Also user input elements 94, 96, based on other input technologies are well known. As shown, the system may maintain two separate user interfaces, such as for competition between two users in a gaming environment, or for supervision in an educational environment. Of course, the Figure has only a subset of all possibilities and features available in the art.

Figure 2:
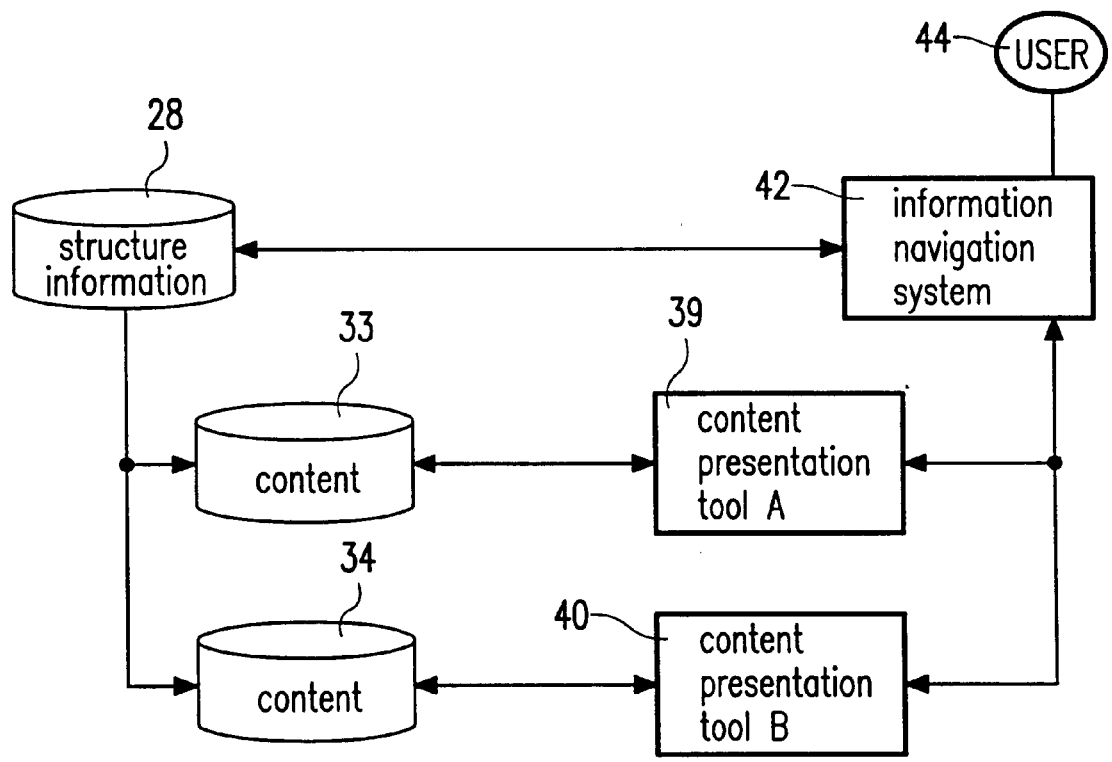
FIG. 2, a user environment of a structure-based multimedia system.

FIG. 2 shows a user environment of a structure-based multimedia system. An information navigation facility 42 has been provided for allowing the user person 44 to move around during actual accessing. The overall structure is presented in an explicit manner by means of facility 28 as will be described more in detail hereinafter. The organization and presentation of the structure is the mainstay of the disclosure hereinafter. As the interaction pattern evolves, the user often wants to keep track of what has been done or achieved already, and of what can be done next, given what has been done already. Further elements of the Figure are contents 33, 34 with respectively associated content presentation tools 39, 40.

The presenting to the standard user includes indicating subjects that have been considered already, subjects that may be undertaken, in view of past performance and dependency relations, and allows a user person to specify particular preferences, and associated paths therefor. Benefits include a better overview regarding the nature of past use, and a greatly enhanced possibility to specify wishes and particular fields of interest. Various advantages for the end user are:

a clear overview of the entire content of the package;

the possibility of direct access to all parts;

an overview of any existing dependency relations between different parts of the package;

an overview of those parts that have already been done, and of those parts that can be done in view of any further dependency relations, through the system saving user history;

improved access to those parts that are of relatively greatest interest to the user.

Characteristically, even if a user pursues only one single goal, often various different presentation sequences may lead to this goal.

For many specific areas of application, users and authors experience a particular information structure as being more natural than others. The organization of such structure, and its presentation through use of a structure model, are the mainstay of the disclosure hereinafter. Also here, during the evolving of an interaction pattern, a user or author person may want to keep track of what has been done or achieved already, either on an elementary level, or on various higher ones.

In normal use of the finished system, users interact therewith through an information navigation system that makes use of a structure information database. This database contains information in accordance with the information model chosen for the domain of the application under consideration. The information navigation system may invoke various presentation tools, for example for respective different types of multimedia building blocks. The multimedia building blocks and the manner they are linked through the use of an information model will be described hereinafter.

An important facility for structuring multimedia software is its ability to let parts thereof be developed, such as presentations, examples, summaries, as multimedia building blocks (MMBB), that are pieces of multimedia software which can combine various assets of different form, such as text, graphics, animation, sound and video. An example of such a multimedia building block is the showing of a sequence of still pictures accompanied by a sound track. Another example is the showing of a complicated technical construction drawing that is gradually built up in an animation accompanied by sound, and introduced by a piece of video. Separately, such multimedia building blocks can be produced with standard authoring tools, together with standard asset production tools. They can be incorporated into larger multimedia software packages, using a standard linking environment. When completed, the structure information database for a multimedia software system contains references to all multimedia building blocks that form part of the package in question.

Clearly, the main problems addressed by the invention are the insufficient presence of structure information in a multimedia title and the limited possibility of content area experts to contribute to the software creation process.

For improving the situation, according to the invention first an application domain is chosen, that is a coherent class of applications for which one wants to develop multimedia software. Applicable domains may be: education, company presentations, touristic presentations, encyclopedias, and more specialized knowledge presentation systems. For such a particular domain, an information or structure model defines constraints on the information that can be expressed to restrict the kind of statements that are allowable in an application. Also the model specifies possible references to actual multimedia building blocks, as will be described below. Hereinafter, information has been modelled according to a technique that is known per se from the semantic data modelling technique. A very elementary example of an information model is as follows: information can be presented about suppliers and customers for a certain class of goods, and it may be specified that a particular customer is client of a specific supplier.

An information model for a particular application domain can be implemented with windowed forms which enable domain experts in the domain in question to themselves enter structure information of a particular application. The windowed forms can be rapidly implemented through database management tools that are widely known in the art, such as the package Microsoft Access. Thereupon, the same database management tool allows to check the information, provided that the tool is expanded to fit the particular application domain. These checks give feedback to the developer person on the state of consistency and completeness which the development has attained, so alleviating the burden of testing the final product(s). In an authoring environment such as this, the structure of the course proper can be developed by a person who can play this role of architect without having programming expertise. This developer can be assisted by the providing of automacially generated summaries according to different points of view with respect to the information.

Furthermore, end users of the application may navigate through the application with a "helicopter view", wherein the scope of the actual view can be varied independently of actual context.

Figure 3:
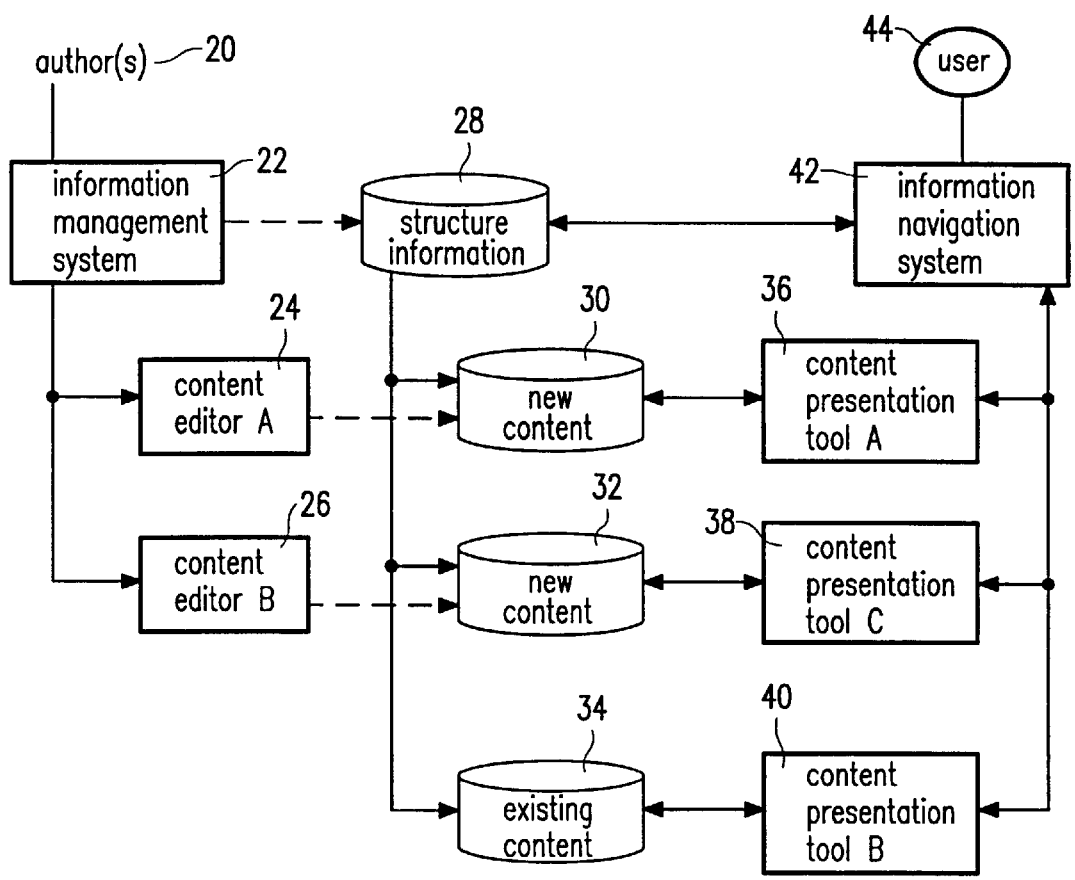
FIG. 3, an authoring environment of a structure-based multimedia system.

FIG. 3 shows an authoring environment of a multimedia system that according to the invention is based on a multilevel organization structure. This setup is largely an extension of FIG. 2, and like parts carry identical references. Additional facilities have been provided for allowing an author person to move around during actual accessing. These relate in particular to new content elements 30, 32, with respectively associated content presentation tools 36, 38, and respectively associated content editors 24, 26, and a secondary information management system 22 for an associated author 20. There is an information management facility for developing a structure information database 28, with direct access to content editors 24, 26. Generally, the standard user is disauthorized to use the latter mechanism, for example, by a password block. The information description lists the various multi-media building blocks, in particular with referrals to other multimedia building blocks, and if applicable, with dependency relations therebetween. An authoring environment may provide reports that present different views on the structure information, and can be provided with checks on consistency and completeness of the package itself, all these for benefitting the author. The information management system of FIG. 3 for developing information structure databases may also be referred to as a "structure authoring tool".

Much older multimedia software consists only of a single multimedia building block, so that a structure containing various multimedia building blocks is not explicitly available. An essential aspect of the invention described here is the dividing of the multimedia software into a plurality of multimedia building blocks: these are then coupled in an information structure description, which is explicitly presented to a user; an essential aspect of this division into multimedia building blocks is that it is done in accordance with an information model that is especially tailored towards a particular application domain. Multimedia building blocks may have different forms and also, different functions. Examples of forms of multimedia building blocks are video, animation and text, and combinations thereof. Examples of functions of multimedia building blocks are presentation, example, and in the field of education: exercise and test. In addition to multimedia building blocks, an important aspect of an information model for a multimedia software system is that it may specify dependency relations between various parts of the software. If a user cannot inspect the parts of the multimedia in an arbitrary order, the kinds of restrictions that are relevant should be incorporated into the information model.

In the authoring environment of FIG. 3, apart from the user person 44 and the author person 20, all blocks in the diagram represent software blocks, a limited selection of which will produce direct physical output to the user, or for that matter, to the author. Commercially, the first one is most relevant. In particular however, the situation depicted occurs during the developing of the multimedia system. In consequence, existing content items such as 34 can be presented to the user person 44 through an appropriate information navigation system 42 that allows the user to navigate through the various content items with the help of content presentation tool 40. For simplicity, the actual presentation of the content, inclusive of interactivity features with the content proper, such as hotspotting, answering questions, terminating, and the like, have not been represented in the Figure, inasmuch as this centers on the principles of structuring multimedia systems on a global level. The navigating by the user person is supported by block 28 that contains structure information on the actual structure of the multimedia system regarding new content blocks 30, 32 and existing content block 34. New content blocks 30, 32, go with associated content presentation tools 36, 38, that may differ or not from block 40.

During the constructing of the multimedia system, an author person 20 will add new content items, such as blocks 30, 32. Each such item needs a content presentation tool 36, 38, that is provided to the system in conjunction with the associated content item. These tools need not have mutually unique character, but may, in conjunction with content of similar character, also share properties, and may even be the same. The presentation of the content items is effected by the author through a respectively associated content editor, that again need not be unique to the new content item in question. For setting up the information structure database 28, the author person has available an information management system. In the process of entering structure information, block 28 can be used with windowed forms for a database management system. In this process, the author does not need to program, inasmuch as the windowed forms of the authoring system assist the author with the terminology of the application domain. Through the information management system, the author person has direct access to the various content authoring systems for developing multimedia building blocks that form the actual contents of the system under construction.

For the author, the benefits of explicitly added structure information to multimedia content are various. First, it offers a flexible migration path from a current status to future high-quality software for storing on high density discs. For example, one can develop multimedia titles supplementing books with structure-based navigation facilities and with (interactive) presentations, such as video or animations. It is essential to manage the enormous capacity of these new disks, and this is possible with the presently described approach. The underlying technology offers the designer of multimedia titles, (who in essence must be an expert only in the actual domain) the possibility to develop parts of the software himself, thereby reducing the potential communication bottlenecks with the software engineers. The effect on the overall development process is:

more control over the complexity of the (interactive) software upscalability of the method, which is important in view of increasing disc capacity better extensibility of the (content) software which feature is not even limited to only multimedia automatic testability of structure-related constraints of the software the use of more generic, high quality navigation software The set-up described above is an essential basis for developing more advanced functionality for adaptive guidance by multimedia software systems. For optimum useability, the size of the multimedia building blocks should neither be very large nor very small. The setup described above can in a natural way be combined with the possibility of World-Wide-Web-like navigation. In particular, any multimedia building block may contain hotspots that direct the user to some other multimedia building block, or even to places outside the system. Such an excursion should be accompanied by the facility to jump back to the multimedia building block where the excursion originated, to allow the user to proceed with the course.

Application to Education

This section describes an implementation of the above for the application domain of education. The central item is the course structure database, which contains an overview of the entire course, with references to actual multimedia contents of various elements of the course. A person who develops such a course structure information database will be referred to hereinafter as a course maker (author, designer, developer): this person may do the authoring as well as overall design. A user of an information navigation system especially suited for education, in accordance with the information model described infra, will be called a student. Both types of persons may be defined at various higher and lower levels, regarding the degree of amending that is allowed, and regarding the level of actual study.

The content of a course structure database is in accordance with a broadly applicable course structure model, that will be described hereinafter. First, the course itself consists of course units, which may be organized in a hierarchical structure. These units describe the structure of the course material, analogous to the list of chapters, sections, etcetera which describes the content of a book. However, in a book, and also on a physical storage medium, these course units are ranked along a linear storage axis. However, through an independent presentation facility, a multimedia title has usually many more degrees of freedom. When necessary, the course must impose restrictions on the allowable presentation sequences, in that the student should be acquainted with certain course units, before being allowed to access certain other course units.

Figure 4:
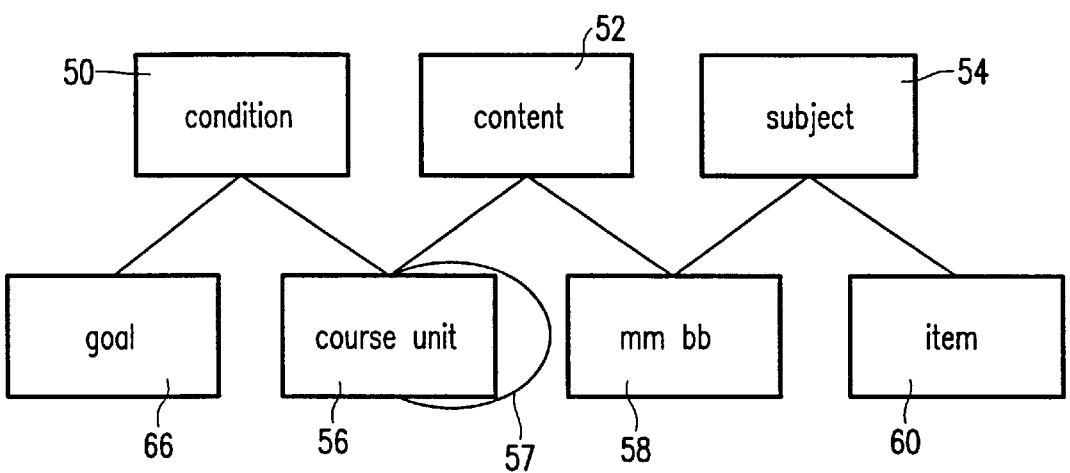
FIG. 4, a course structure model with goals.

FIG. 4 shows an exemplary course structure model with goals 66. An outline of a course structure model of wide applicability in terms of course units 56 will been given hereinafter. The content of a course structure database should be in accordance with a course structure model. The hierarchical organization amongst the course units can be done with explicit goals, as shown in the present Figure. Thereto, the course maker specifies a list of goals that should be attained with this particular course. Such learning goals specify terminal, as well as intermediate, learning objectives of the course. Further, for each course unit preconditions or prerequisite goals may be given: these are goals that must be satisfied before the course unit in question can be done. Additionally, for each course unit postconditions or accomplished goals may specify which goals can be achieved with this course unit, given the preconditions of the course unit. Both types of conditions have been symbolized in block 50. In addition to the above, the lower levels of the course hierarchy include multimedia building blocks 58, and items 60. Circular line 57 symbolizes the hierarchization among the various course units which means that various course units have particular parent course units that may be given precedence in the presentation to the user. A parent course unit may contain an introduction to and an overview of all secondary course units contained in it. Such a hierarchical structure may also be imposed on the set of goals 66.

Figure 5:
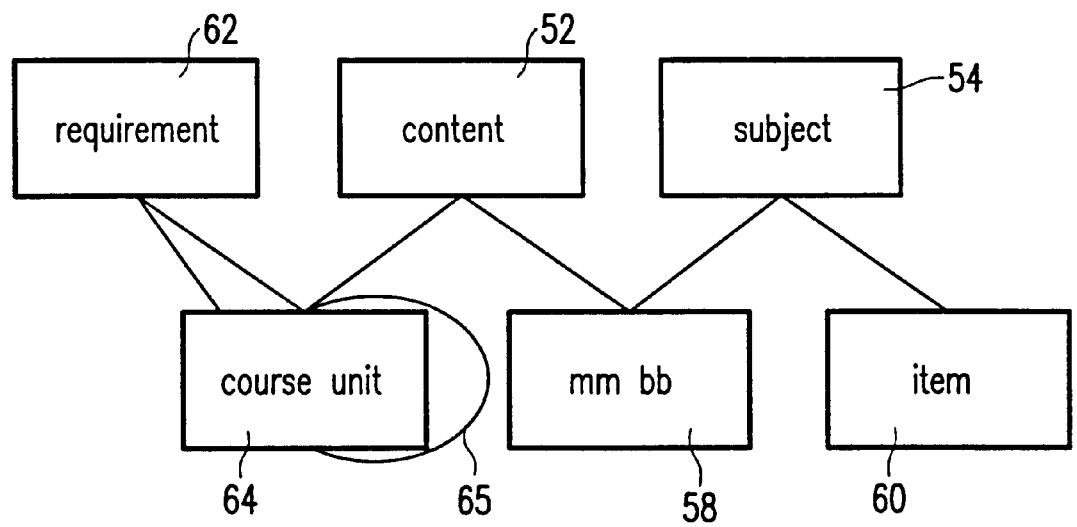
FIG. 5, a course structure model without goals.

Similarly, and with various likewise numbered elements, FIG. 5 shows a course structure model that in particular contains no goals. Here, for each course unit 64, respectively associated requirements can be specified, in the form of a list of other course items that are required before the present course item can be accessed. Circular line 65 has the function of line 57 in the preceding Figure. The double interconnection between requirement block 62 and course unit block 64 symbolize that a particular course item can be a prerequisite for a particular other course item. Often, the latter type of structure can be used in a quite straightforward manner to develop an existing course, such as embodied in a book or similar serially-organized medium, into a true multimedia course. In contradistinction, the earlier model of FIG. 4 may lead to a better modularized course description; the reason is that greater freedom exists in defining conditions and results if the tree-type organization of FIG. 4 is followed. The course structure model without goals has wider applicability than education. Through replacing the name 'course unit' by 'unit ' or 'section' it can serve as a more generally applicable model for structuring multimedia material with dependency relations. In the same way, the course structure model with goals can be expanded beyond education.

A course unit may contain multimedia building blocks that vary both as regards their internal structure, and also as regards their character on the level of the overall functioning of the unit; thus, these building blocks may inter alia be presentations, exercises, examples, and tests. For example, a building block may be a set of multiple choice questions that are introduced by video, and puts the questions and possible answers in a context by way of feedback. The multimedia building block itself can be realized with an extensive amount of existing authoring tools. Further, a course unit can contain several multimedia building blocks, together with an associated ordering thereamongst. In a typical case, a part of the multimedia building blocks would have to be traversed in a prescribed sequence. Other such multimedia building blocks need not necessarily obey this prescription, for example, such that pertain to extra examples, a summary, or a report of earlier usage.

In addition to course units, goals, and multimedia building blocks, the course structure description may contain items 60 needed in the course. For example, an item can describe a specific concept, technique or case treated in the content of a course. An index of a book can be considered as a list of items. In the course structure model, for each multimedia building block a list of items can be given to describe the content of this multimedia building block. There exist several natural extensions of the course structure models described here. For example, items may be divided into different categories.

In FIGS. 4, 5, the notation of semantic data modelling has been used. As far as used here, the notation of semantic data modelling can briefly be explained as follows. An information model is described as a collection of data types, which themselves are a collection of attributes (that are other types). Composite types containing more than one attribute, are drawn as rectangles containing their names. The attributes of a type are drawn below the type itself. Basic types, containing just one attribute, are not drawn. When a data type is drawn with a connection to another data type that is positioned higher in the Figure, it stands "one-side" in a one-to-many relation to this other data type. Now, basic information types course unit, multimedia building block, item, and goal, are connected by relations. The content relation 52 describes which multimedia building blocks are present in a course unit. The subject relation 54 describes which items are treated in a multimedia building block. In the setup of FIG. 4, the condition relation 50 describes which precondition and postcondition goals pertain to a particular course unit. In the setup of FIG. 5, the requirement relation 62 describes which other course units must precede a particular course unit. As an example of a one-to-many relation, note that a particular goal may appear in many conditions, whereas each condition refers to exactly one goal.

For a course maker it is very useful to be supported by automatically generated overviews of various elements of the information structure, for example, reports presenting lists of goals, course units, multimedia building blocks, and items. Further relevant are lists of course units with goals (including prerequisite as well as accomplished goals), goals with course units (including course units for which the goal is a prerequisite as well as course units where the goal is being accomplished), course units with multimedia building blocks, multimedia building blocks with items, and items with multimedia building blocks. Such overviews are of great help for developing a coherent course structure description. Irregularities in the structure of the information are easily spotted. In addition, the authoring process can be supported by automatically generated course unit reports, which contain the goals (prescribed as well as accomplished goals), and multimedia building blocks with associated items. The internal structure and design of the multimedia building blocks can be described with script documents, which can be used as a basis for an implementation. Several important examples of checks can be described as follows:

all course units can be reached with the requirements and conditions as stated there are no cyclic relations between the requirement and/or condition relations all multimedia building blocks referred to are indeed available.

Figure 6:
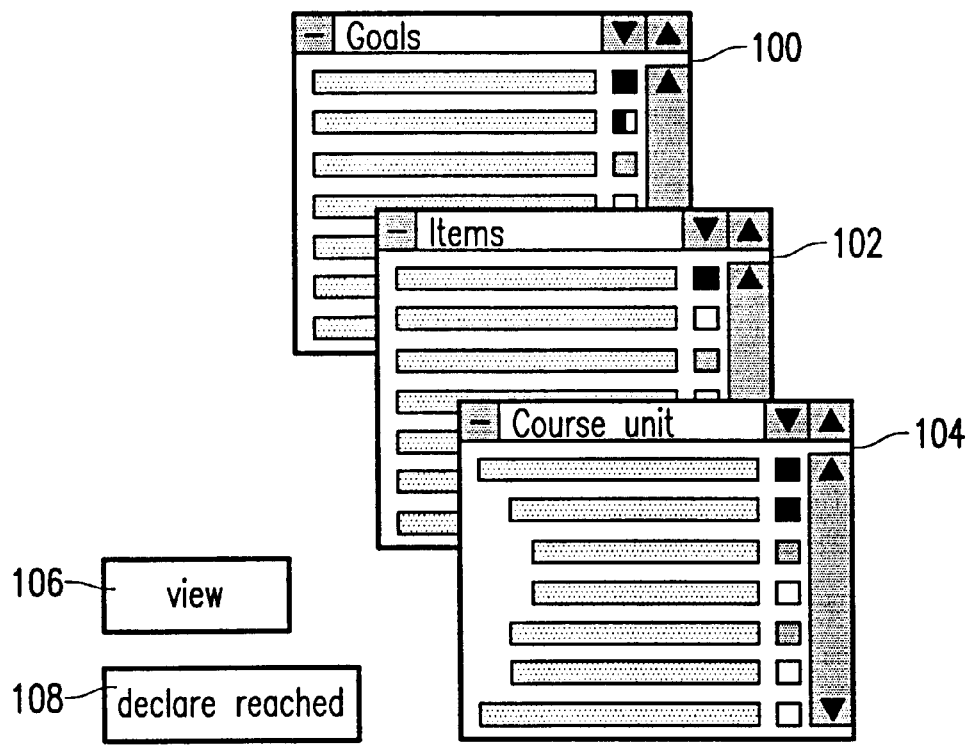
FIG. 6, a user navigation interface model.

FIG. 6 shows a user navigation interface model. Here, an interface for user navigation is worked out for the setup according to FIG. 4. Adaptation to FIG. 5 is largely realized by reformulating all statements relating to goals (block 66)

using the requirements necessary for particular course units. In particular, the course structure information can be presented to the user person in the form of a table of contents 104 listing the course units, a list of goals 100 and a list of items 102. As shown in the example, the visual format corresponds to the WINDOWS idiosyncrasy. The Figure contains two control buttons. Button 106 controls the viewing by the user of a particular course unit, item, or goal. Button 108 allows the user to input a signal declaring that the element in question has been reached. In this way, the user person can specify that certain parts of the course should be viewed as reached, without requiring that these parts should actually have been done The status of each course unit, goal, and item will change as the student progresses in the interaction with the system. For brevity, mousewise selecting within the Figure has been ignored.

Each element of lists 100, 102, 104 has associated a check box for displaying actual status. In a comprehensive manner, the status can be defined by four values that respectively represent done, reached, doable, and not doable. In the Figure, black denotes done, half-black denotes reached, grey denotes doable, and white denotes not doable. When the user person has actually done a certain course unit to a sufficient extent, the course unit in question gets the status done, together with the items, postcondition goals, and multimedia building blocks that the course unit contains. Alternatively, a student who already masters certain introductory parts of the course may declare the goals pertaining to such parts as reached without actually having done these parts. A course unit, goal, multimedia building block or item is doable when it is not already done or reached, and when it is a course unit, whose preconditions have been marked as either done or reached (or when it appears as postcondition in such course unit). A goal, course unit, multimedia building block or item is not doable, when it is neither done, reached, nor doable. Not doable does not necessarily mean that the corresponding information is not accessible: just a in a book, the student can view later parts of a course without having enough knowledge for following everything.

Figure 7:
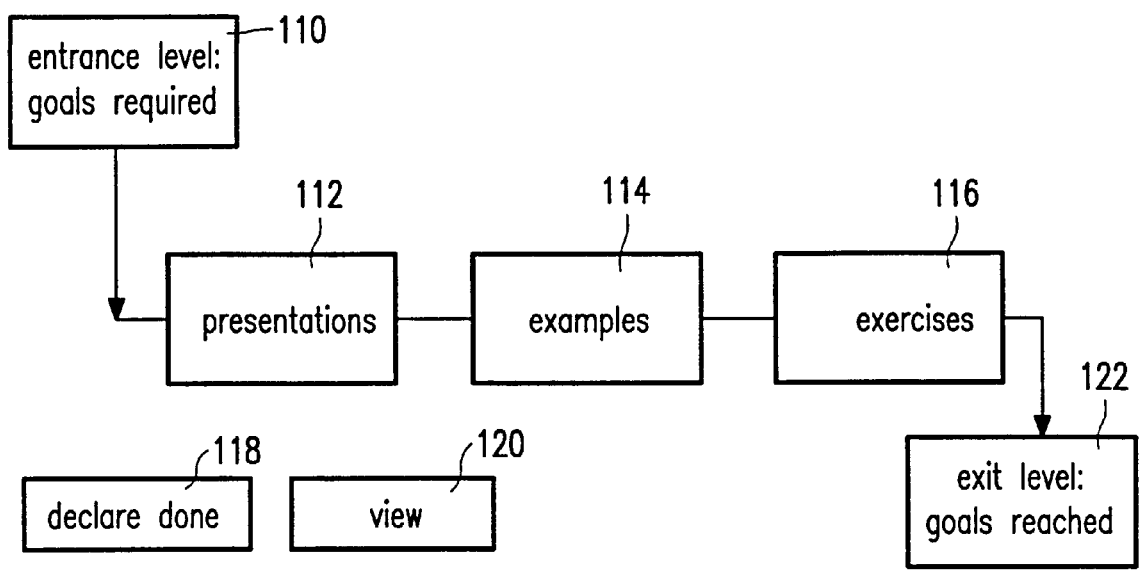
FIG. 7, an exemplary user view on a course unit.

For a particular course unit, the multimedia building blocks contained therein can be presented to a user as structured according to the view shown in FIG. 7. As shown, the multimedia building blocks are ranged into the classes of presentations 112, examples 114, and exercises 116. For each goal, course unit, multimedia building block, and course item, the system contains history data as based on past use, and moreover option data relating to possible future use. The entrance goals of the course unit in question are specified as listed in block 110. A successful completion of the course means that all goals are reached at the exit level as listed in block 122. Intermediate signalling of actual accessing of the course unit and fulfilling at least part of the associated requirements is given by done in block 118. This signalling can be effected by the student, independently of actually fulfilling all associated requirements. Although not shown in FIG. 7, the system can also display multimedia building blocks present, together with direct connections to other, in particular earlier course units. The multimedia building blocks may contain presentations, examples, exercises, etc. When a course unit is finished, other course units for which the requirements are now fulfilled, can also be viewed. The multimedia building blocks in a course are accompanied by check boxes that represent their status (not shown). Further button 118 allows a user to declare the course unit to be done, and another one 120 with which the user can view a selected multimedia building block. Next to presentations, exercises, and examples, a course unit may include multimedia building blocks presenting appropriate tests.

Figure 8:
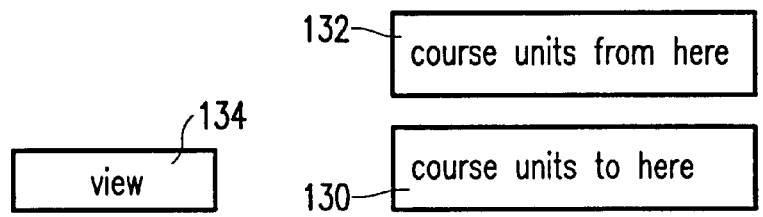
FIG. 8, an exemplary user view on a course goal.

FIG. 8 shows an exemplary user view on a course goal. For this goal, the view presents in block 132 course units where the present goal is a precondition, and in block 130 course units where the present goal is a postcondition. Actuation of viewing button 134 selects a particular course unit for closer inspection.

Figure 9:
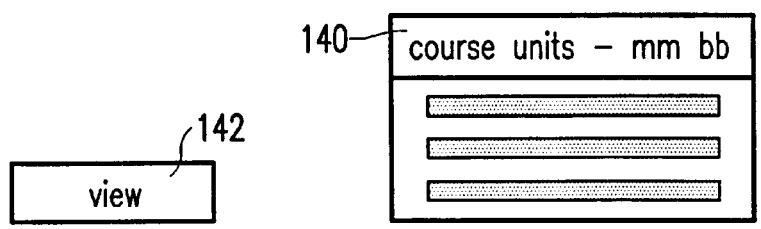
FIG. 9, an exemplary user view on a course item.

FIG. 9 shows an exemplary user view on a course item. The image displays a list 140 of pairs; each pair consists of a particular course unit and an associated multimedia building block. For each multimedia building block, also the course unit to which it belongs is shown. Block 142 controls the selective viewing of the multimedia building blocks.

A basic procedure for guiding user navigation uses the status attributes of goals, course units, items, and multimedia building blocks as follows:

at each instant in time, the user can declare any basic information item to be done or reached;

upon each done/reached declaration by the user of the status value of a goal or course unit, the done/reached status values of all basic information items are recomputed by the system and presented to the user as follows:

when a course unit has been declared to be done, its postcondition goals are also set to done;

all course units which are not yet done or reached, but for which the postcondition goals are now done are set to reached (this allows the possibility that the system may have alternative course units towards certain goals, for example differing in abstraction level);

the multimedia building blocks and items contained in the course unit itself and those in the alternative course units with the same postcondition goals are set to reached if their status is not already done or reached; in this way, a student may for example always distinguish between exercises which he has actually done, and other exercises that he has not done.

after the done/reached values have been recomputed in the way just described, new information items may get the status doable, in the following way:

a goal, course unit, multimedia building block or item becomes doable when it is not done or reached, and if it is a course unit, or if it appears in a course unit, whose preconditions have been marked as either done or reached.

Of course, there are various possibilities for variation and extension of the user interface and navigation guidance procedure described above for students. An extension for students is the possibility to specify goals having a fifth value desired, and furthermore suggestions by the system for sequences of course units aiming at the desired goals. Another possibility is that the system can run as an "automatic pilot" presenting trains of multimedia building blocks to the user in some allowed sequence, without the user having to declare that certain parts of the course are done.

The structure sketched in FIG. 6 can be of benefit to authors as well. This overview can be extended with possibilities to change, add, and delete parts of the information, in order to make it useful as a structure authoring system for course makers. Direct integration with content authoring tools for making multimedia building blocks is possible. For authors it is useful to replace the status overviews for students with status overviews of the work already done, and the work that remains to be done, for example on the actual construction of multimedia building blocks to finish the course.

For an actual exemplary embodiment, hereinafter part of an actual course structure is presented. First, an overview is given of the course "Programming Principles", consisting of the hierarchy of course units and the multimedia building blocks contained therein. Next, the preconditions and postconditions of all course units are presented. Subsequently, the presentation comprises a list of multimedia building blocks with items, of which for brevity only a significant part has been presented.

Course unit structure with building blocks

| | | | |
|---|---|---|---|
| 04 Jul. 1997 top course unit: | Programming Principles programming principles | building block 1 programming intro 2 programming conclusion | 86 87 |
| course unit | contained | building block | bb# |
| general introduction | | 1 awareness of method: intro | 14 |
| | | 2 general introduction to computing | 15 |
| | | 3 awareness of method, end | 88 |
| quantified expressions | | 1 predicate logic, open | 21 |
| | | 2 quantified expressions, quantors | 22 |
| | | 3 predicate logic, end | 23 |
| | | 4 exercise pred1 | 24 |
| | | 5 exercise pred2 | 27 |
| | | 6 exercise pred3 | 28 |
| | | 7 exercise pred4 | 29 |
| | | 8 exercise pred5 | 30 |
| | | 9 exercise pred6 | 31 |
| states and assertions, specifications axiomatic semantics of program constructs | | 1 programming notions: intro | 17 |
| | | 2 notions | 18 |
| | | 3 state transformations | 89 |
| | | 4 programming notions: end | 20 |
| | | 1 semantics open | 32 |
| | | 2 programnming constructs | 33 |
| | | 3 semantics end | 34 |
| | semantics of assignment statement | 1 assignment intro | 35 |
| | | 2 assignment statement | 36 |
| | | 3 assignment end | 37 |
| | | 4 exercise assignment | 38 |
| | semantics of | 1 concatenation intro | 39 |
| | | 2 concatenation | 40 |
| | | 3 concatenation end | 41 |
| | | 4 exercise semseq1 | 42 |
| | | 5 exercise semseq2 | 43 |
| | | 6 exercise semseq3 | 44 |
| | | 7 exercise semseq4 | 45 |
| | semantics of input and output | 1 io intro | 57 |
| | | 2 read and write | 58 |
| | | 4 io end | 59 |
| | | 5 exercise io1 | 60 |
| | | 6 exercise io2 | 61 |
| | semantics of selection | 1 selection intro | 46 |
| | | 2 selection | 47 |
| | | 3 selection end | 48 |
| | | 4 exercise semsel1 | 49 |
| | | 5 exercise semsel2 | 50 |
| | | 6 exercise semsel3 | 51 |
| | | 7 exercise semsel4 | 52 |
| | pragmatics of repetition | 1 repetition intro | 53 |
| | | 2 pragmatics of repetition | 54 |
| | | 3 repetition end | 55 |
| | | 4 exercise semrep1 | 56 |
| finding of invariants | | 1 invariants intro | 63 |
| | | 2 invariants | 64 |
| | | 3 invariants end | 65 |
| | omission of a term in a conjunction | 1 omission intro | 90 |
| | | 2 omission of term | 91 |
| | | 3 omission end | 92 |
| | | 4 exercise omission | 93 |
| | replacement of a constant by a varia | 1 replacement inrro | 94 |
| | | 2 replacement | 95 |
| | | 3 replacement end | 96 |
| | | 4 exercise repl1 | 97 |
| | | 5 exercise repl2 | 106 |

-continued

Course unit structure with building blocks

| | | | |
|---|---|---|---|
| 04 Jul. 1997 top course unit: | Programming Principles programming principles | building block 1 programming intro 2 programming conclusion | 86 87 |
| course unit | contained | building block | bb# |
| | | 6 exercise repl3 | 107 |
| | | 7 exercise repl4 | 108 |
| | tail invariants | 1 tail invariants intro | 98 |
| | | 2 tail invariants | 99 |
| | | 3 tail invariants end | 100 |
| | | 4 tail invariants exercise 1 | 101 |
| | | 5 tail invariants exercise 2 | 109 |
| | | 6 tail invariants exercise 3 | 110 |
| | the carpenter's square | 1 Carpenter's square intro | 102 |
| | | 2 The Carpenter's Square | 103 |
| | | 3 Carpenter's Square end | 104 |
| | | 4 Carpenter's Square exercise | 105 |
| | | 5 Carpenter's Square exercise | 111 |
| | equalisation | 1 Equalisation intro | 77 |
| | | 2 Equalisation | 112 |
| | | 3 Equalisation end | 113 |
| | | 4 exercise Equalisation | 114 |
| procedural abstraction | | 1 procedural abstraction intro | 66 |
| | | 2 procedures and functions | 67 |
| | | 3 procedural abstraction end | 68 |
| | functions and expression abstraction | 1 functions intro | 119 |
| | | 2 functions and expressions | 120 |
| | | 3 functions end | 121 |
| | | 4 exercise functions | 122 |
| | procedures and action abstraction | 1 procedures intro | 115 |
| | | 2 procedures and actions | 116 |
| | | 3 procedures end | 117 |
| | | 4 exercise procedures 1 | 113 |
| | stepwise refinement | 1 stepwise refinement intro | 123 |
| | | 2 stepwise refinement | 124 |
| | | 3 stepwise refinement end | 125 |
| | | 4 exercise stepwise refinement | 126 |
| data abstraction | | 1 data abstraction intro | 69 |
| | | 2 data abstraction | 70 |
| | | 3 data abstraction end | 71 |
| | introduction to data abstraction sets | 1 sets intro | 127 |
| | | 2 sets | 128 |
| | | 3 sets end | 129 |
| | | 4 exercise sets 1 | 130 |
| | | 5 exercise sets 2 | 131 |
| | | 6 exercise sets 3 | 132 |
| | sequences | 1 sequences intro | 133 |
| | | 2 sequences | 134 |
| | | 3 sequences end | 135 |
| | | 4 exercise sequences 1 | 136 |
| | | 5 exercise sequences 2 | 137 |

Course units with goals

| | |
|---|---|
| 04 Jul. 1997 course unit | Programming Principles goal | axiomatic semantics of program constructs

| | |
|---|---|
| required | skills in writing simple quantified expressions |
| accomplished | skills in the design of most important program constructs | data abstraction

| | |
|---|---|
| required | skills in the design of most important program constructs |
| accomplished | capability in the design of |

-continued

Course units with goals

| 04 Jul. 1997 course unit | | Programming Principles goal |
|---|---|---| equalisation
| | required | ability to find tail invariants |
| | accomplished | ability to find invariant by equalisation | finding of invariants
| | required | skills in the design of most important program constructs |
| | accomplished | skills in the construction of repetitions using Hoare's invar | functions and expression abstraction
| | required | skills in the design of most important program constructs |
| | accomplished | skills in the specification and application of function subp | general introduction
| | accomplished | appreciation for the approach insight in position of programming in computing science | introduction to data abstraction
| | required | skills in the design of most important program constructs |
| | accomplished | skills in the specification, application and implementation | omission of a term in a conjunction
| | required | skills in the design of most important program constructs |
| | accomplished | ability to find invariant by omitting term in postcondition | pragmatics of repetition
| | required | ability to apply if constructions |
| | accomplished | ability to apply Hoare's invariance theorem | procedural abstraction
| | required | skills in the design of most important program constructs |
| | accomplished | skills in the design of functions and procedures | procedures and action abstraction
| | required | skills in the design of most important program constructs |
| | accomplished | skills in the specification and application of procedures | programming principles
| | required | polytechnical level in mathematics and computing science |
| | accomplished | capability in the design of abstract data types and structure capability in the design of algorithms with correctness con | quantified expressions
| | required | insight in the way of formal specification |
| | accomplished | skills in writing sample quantified expressions | replacement of a constant by a variable
| | required | skills in the design of most important program constructs |
| | accomplished | ability to find invariant by replacing constant by variable |

-continued

Course units with goals

| 04 Jul. 1997 course unit | | Programming Principles goal |
|---|---|---| semantics of assignment statement
| | required | skills in writing simple quantified expressions |
| | accomplished | ability to apply the backward assignment rule | semantics of input and output
| | required | ability to apply the backward assignment rule |
| | accomplished | ability to apply the semantics of i/o statements | semantics of selection
| | required | ability to apply the concatenation rule for the : (semicolon |
| | accomplished | ability to apply if constructions | semantics of sequention
| | required | ability to apply the backward assignment rule |
| | accomplished | ability to apply the concatenation rule for the : (semicolon | sequences
| | required | skills in the design of most important program constructs skills in the specification, application and implementation |
| | accomplished | ability to recognise where sequence structures can be used skills in the design of sequence structures | sets
| | required | skills in the design of most important program constructs skills in the specification, application and implementation |
| | accomplished | ability to recognise set structures skills in the design of set structures | states and assertions, specifications
| | required | appreciation for the approach insight in position of programming in computing science |
| | accomplished | ability to place notions in context insight in the way of formal specification | stepwise refinement
| | required | skills in the design of most important program constructs skills in the specification and application of procedures |
| | accomplished | ability to use stepwise refinement in larger programs | tail invariants
| | required | ability to find invariant by omitting term in postcondition ability to find invariant by replacing constant by variable |
| | accomplished | ability to find tail invariants | the carpenter's square
| | required | ability to find tail invariants |
| | accomplished | ability to find invariant by carpenter's square method |

Building Blocks with Items

04 Jul. 1997

| building block | item | bb # | bb type | file |
|---|---|---|---|---|
| assignment end | | 37 | Video | assend.avi |
| assignment intro | | 35 | Video | assint.avi |
| assignment statement | | 36 | Director | assign.dir |
| | assignment statement | | | |
| | backward assignment rule | | | |
| awareness of method, end | | 88 | Video | methend.avi |
| awareness of method: intro | | 14 | Video | methint.avi |
| Carpenter's Square end | | 104 | Video | squarend.avi |
| Carpenter's Square exercise 2 | | 111 | word | xsquare2.doc |
| Carpenter's Square exercise 1 | | 105 | word | xsquare1.doc |
| | Carpenter's Square | | | |
| Carpenter's square intro | | 102 | video | squarint.avi |
| | Carpenter's Square | | | |
| | saddleback search | | | |
| concatenation | | 40 | Director | concat.dir |
| | concatenation of statements | | | |
| | semantic rule for the | | | |
| concatenation end | | 41 | Video | concend.avi |
| concatenation intro | | 39 | Video | concint.avi |
| data abstraction | | 70 | Director | databs.dir |
| data abstraction end | | 71 | Video | databend.avi |
| data abstraction intro | | 69 | Video | databint.avi |
| | abstract data structure | | | |
| | abstract data type | | | |
| | abstraction function | | | |
| | implementation of data type | | | |
| | information hiding | | | |
| | representation invariant | | | |
| | specification of data type | | | |
| Equalisation | | 112 | director | equalis.dir |
| Equalisation end | | 113 | director | equend.avi |
| Equalisation intro | | 77 | Video | equint.avi |
| | conditional construct | | | |
| | invariant | | | |
| excercise io1 | | 60 | Word | xio1.doc |
| excercise io2 | | 61 | Wora | xio2.doc |
| exercise assignment 1 | | 38 | Word | xass1.doc |
| exercise Equalisation | | 114 | word | xequalis.doc |
| | binary search | | | |
| exercise functions | | 122 | word | xrun.doc |
| | recursive functions | | | |
| exercise omission 1 | | 93 | Word | xomiss1.doc |
| exercise pred1 | | 24 | Word | xpred1.doc |
| exercise pred2 | | 27 | Word | xpred2.doc |
| exercise pred3 | | 28 | Word | xpred3.doc |
| exercise pred4 | | 29 | Word | xpred4.doc |
| exercise pred5 | | 30 | Word | xpred5.doc |
| exercise pred6 | | 31 | Word | xpred6.doc |
| exercise procedures 1 | | 118 | word | xprocs1.doc |
| exercise repl1 | | 97 | Word | xrepl1.doc |
| exercise repl2 | | 106 | word | xrepl2.doc |
| exercise repl3 | | 107 | word | xrepl3.doc |
| exercise repl4 | | 108 | word | xrepl4.doc |
| | strengthening of invariant | | | |
| exercise semrepl | | 56 | Word | xrepl.doc |
| exercise semsel1 | | 49 | Word | xsel1.doc |
| exercise semsel2 | | 50 | Word | xsel2.doc |

Programming Principles

What is claimed is:

1. A computer method for presentation of a multimedia software package, said multimedia software package comprising multiple assets, that can be presented in various combinations in a dialogue with a person involved, the method comprising executing the following in a data processing device:

using an explicit information structure description, in which multiple multimedia building blocks are linked in accordance with an information model that is especially tailored towards a particular application domain, allowing, according to said information model, expressing, in the information structure description, dependency relations stating or implying that certain parts of the multimedia software package should be accessed before other parts;

expanding said information model to make the information structure description and all the multimedia building blocks accessible to said person as a user person, especially marking those parts of the multimedia software package that have already been visited by the user person, and especially marking those parts of the multimedia software package that can be accessed subsequently by the user person subject to any dependency relations.

2. A method as claimed in claim 1, said information model being expanded with softwared facilities using which the user person as an author person can develop said information structure descriptions, using only expertise in said application domain and without programming effort, and under integration with authoring tools for multimedia content creation, and also expanded with softwared facilities for automatically checking consistency and completeness of information structure descriptions, and for automatically generating overviews according to various different views on the information structure.

3. A method as claimed in claim 1, in which said application domain is education, for developing multimedia course software with an explicit information structure description which is accessible to a user person and which can be developed by a course developer.

4. A method as claimed in claim 1, wherein basic information types are "course unit", "multimedia building block", and "item", that are interrelated through content relations, subject relations and requirement relations.

5. A method as claimed in claim 1, wherein basic information types are "goal", "course unit", "multimedia building block", and "item", related through content relations, subject relations and condition relations.

6. A method as claimed in claim 4, wherein instances of said basic information types have a status variable range comprising the values "done", "reached", "doable" and "not doable", in which the values "done" and "reached" may or may not be identified.

7. A method as claimed in claim 6, furthermore having softwared facilities allowing said user person to declare instances of said information types to be "done" or "reached", and through which facilities the status variable values of other instances of said basic information types are continually updated during interaction with said user person.

8. A method as claimed in claim 6, furthermore having softwared facilities for automatically declaring instances of said information types to be "done" when the corresponding parts of the software package have been visited at least once by the person involved, and through which the status values of further instances of said basic information types are continually updated during the interaction with said user person, and which can automatically present to said user person suitable subsequent multimedia building blocks.

9. A method as claimed in claim 7, furthermore allowing instances of said basic information types to have an additional status value "desired to access", and further allowing to be so marked by the person involved, said method furthermore having softwared facilities for automatically marking in the information structure description a part of the software package, that is a prerequisite in view of any dependency relation toward the parts marked "desired to access".

10. A software package allowing the use of an information structure description having links to multimedia building blocks, for the application domain education, to present said information structure description for navigation by a user person, according to a method for presentation of a multimedia software package, said multimedia software package comprising multiple assets, that can be presented in various combinations in a dialogue with a person involved, characterized in that said method uses an explicit information structure description, in which multiple multimedia building blocks are being linked in accordance with an information model that is especially tailored towards a particular application domain, wherein said information model allows expressing in the information structure description of dependency relations stating or implying that certain parts of the multimedia software package should be accessed before other parts, and wherein said information model is being expanded with softwared facilities, using which the information structure description is accessible to said person involved, who as a user person can also directly access all multimedia building blocks, and using which those parts of the software that have already been visited by the user person become especially marked, and using which those parts of the software that can be accessed subsequently by the user person subject to any dependency relations, also become especially marked.

11. A hardware system programmed with a software package as claimed in claim 10.

12. A development software package for developing information structure descriptions as required by a software package allowing the use of an information structure description having links to multimedia building blocks, for the application domain education, to present said information structure description for navigation by a user person, according to a method for presentation of a multimedia software package, said multimedia software package comprising multiple assets, that can be presented in various combinations in a dialogue with a person involved, characterized in that said method uses an explicit information structure description, in which multiple multimedia building blocks are being linked in accordance with an information model that is especially tailored towards a particular application domain, wherein said information model allows expressing in the information structure description of dependency relations stating or implying that certain parts of the multimedia software package should be accessed before other parts, and wherein said information model is being expanded with softwared facilities, using which the information structure description is accessible to said person involved, who as a user person can also directly access all multimedia building blocks, and using which those parts of the software that have already been visited by the user person become especially marked, and using which those parts of the software that can be accessed subsequently by the user person subject to any dependency relations, also become especially marked, the development software package encompassing executable consistency and completeness checks on said information structure descriptions and furthermore the generating of reports that comprise appropriate overviews of the information structure.

13. A hardware system programmed with a software package as claimed in claim 12.

14. A hardware system being arranged for implementing a method for presentation of a multimedia software package, said multimedia software package comprising multiple assets, that can be presented in various combinations in a dialogue with a person involved, characterized in that said method uses an explicit information structure description, in which multiple multimedia building blocks are being linked in accordance with an information model that is especially tailored towards a particular application domain, wherein said information model allows expressing in the information structure description of dependency relations stating or implying that certain parts of the multimedia software package should be accessed before other parts, and wherein said information model is being expanded with softwared facilities, using which the information structure description is accessible to said person involved, who as a user person can also directly access all multimedia building blocks, and using which those parts of the software that have already been visited by the user person become especially marked, and using which those parts of the software that can be accessed subsequently by the user person subject to any dependency relations, also become especially marked.

15. A computer method for presenting training course materials, the method comprising executing the following on a data processing device:
maintaining the materials in at least one memory device according to an organizational structure that is apparent to a user, the organizational structure comprising a prerequisite structure in which an order of review of the materials is at least suggested to a user;
maintaining markers in the at least one memory device showing which materials the user has already reached or completed and which materials are doable and not doable by that user, so that the user can proceed to succeeding materials within the prerequisite structure.

16. The method of claim 15, wherein the materials are multi-media materials.

17. The method of claim 15, further comprising, for the purpose of authoring the materials, generating course unit reports, comprising goals.

18. The method of claim 15, further comprising, for the purpose of authoring the materials, enabling reorganization of the materials according to different multimedia building blocks.

19. The method of claim 15, further comprising, for the purpose of authoring the materials, checking the materials for organizational errors.

20. The method of claim 19, wherein checking comprises checking whether all units can be reached within stated requirements and conditions.

21. The method of claim 19, wherein checking comprises verifying that there are no cycles in the prerequisite structure.

22. The method of claim 19, wherein checking comprises verifying that all materials referenced in the organizational structure are in fact available.

23. The method of claim 15, further comprising
maintaining in the at least one memory device a set of goals for a user of the materials;
enabling signaling of successful completion of the materials, when the user has reached a threshold number of the set of goals.

24. The method of claim 15, wherein the information structure comprises chapters.

25. A medium readable by a data processing device, the medium embodying software adapted to perform the following:
maintaining the materials in at least one memory device according to an organizational structure that is apparent to a user, the organizational structure comprising a prerequisite structure in which an order of review of the materials is at least suggested to a user;
maintaining markers in the at least one memory device showing which materials the user has already reached or completed and which materials are doable and not doable, so that the user can proceed to succeeding materials within the prerequisite structure.

26. The medium of claim 25, wherein the materials are multi-media materials.

27. The medium of claim 25, further comprising, for the purpose of authoring the materials, generating course unit reports, comprising goals.

28. The medium of claim 25, further comprising, for the purpose of authoring the materials, enabling reorganization of the materials according to different multimedia building blocks.

29. The method of claim 25, further comprising, for the purpose of authoring the materials, checking the materials for organizational errors.

30. The method of claim 29, wherein checking comprises checking whether all units can be reached within stated requirements and conditions.

31. The method of claim 29, wherein checking comprises verifying that there are no cycles in the prerequisite structure.

32. The method of claim 29, wherein checking comprises verifying that all materials referenced in the organizational structure are in fact available.

33. The method of claim 25, further comprising maintaining in the at least one memory device a set of goals for a user of the materials;

enabling signaling of successful completion of the materials, when the user has reached a threshold number of the set of goals.

34. The method of claim 25, wherein the information structure comprises chapters.

* * * * *